United States Patent
Shimomura

(10) Patent No.: US 7,075,690 B2
(45) Date of Patent: Jul. 11, 2006

(54) OPTICAL SCANNING DEVICE AND IMAGE FORMING APPARATUS USING THE SAME

(75) Inventor: Hidekazu Shimomura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 86 days.

(21) Appl. No.: 10/810,581

(22) Filed: Mar. 29, 2004

(65) Prior Publication Data

US 2005/0046916 A1 Mar. 3, 2005

(30) Foreign Application Priority Data

Aug. 27, 2003 (JP) .............................. 2003-208958

(51) Int. Cl.
*G02B 26/08* (2006.01)

(52) U.S. Cl. ...................... 359/205; 359/204; 359/206; 359/215

(58) Field of Classification Search ........ 359/204–206, 359/589, 634, 722, 212–216; 347/233–235, 347/243; 250/234–236
See application file for complete search history.

(56) References Cited

U.S. PATENT DOCUMENTS

| | | | | |
|---|---|---|---|---|
| 5,247,385 A * | 9/1993 | Takanashi | .................... | 359/205 |
| 5,724,172 A * | 3/1998 | Ota | ............................ | 359/206 |
| 5,764,399 A * | 6/1998 | Iizuka | ........................ | 359/205 |
| 6,259,547 B1* | 7/2001 | Kamikubo | .................. | 359/205 |
| 6,317,246 B1* | 11/2001 | Hayashi et al. | ............. | 359/204 |
| 6,388,791 B1* | 5/2002 | Mochizuki et al. | ......... | 359/205 |
| 6,400,391 B1 | 6/2002 | Suhara et al. | ................ | 347/244 |
| 6,496,293 B1* | 12/2002 | Kawamura | .................. | 359/212 |
| 6,683,707 B1 | 1/2004 | Ishihara et al. | ............. | 359/205 |
| 2002/0126362 A1 | 9/2002 | Shimomura | .................. | 359/196 |
| 2003/0025784 A1 | 2/2003 | Sato et al. | .................... | 347/244 |
| 2003/0048352 A1 | 3/2003 | Kato et al. | .................... | 347/258 |
| 2003/0053815 A1 | 3/2003 | Testardi et al. | ............... | 399/79 |
| 2003/0128412 A1* | 7/2003 | Iizuka | | |
| 2004/0027446 A1 | 2/2004 | Kato et al. | .................... | 347/228 |

FOREIGN PATENT DOCUMENTS

JP 9-21944 1/1997

OTHER PUBLICATIONS

Ohara Glass Catalog (which can also can be viewed on the internet at http://www.oharacorp.com/PDF/Ohara_Glass_Catalog.pdf).

* cited by examiner

*Primary Examiner*—Euncha P. Cherry
*Assistant Examiner*—Pranav Khatri
(74) *Attorney, Agent, or Firm*—Fitzpatrick, Cella, Harper & Scinto

(57) ABSTRACT

An optical scanning device is provided, which includes: a light source unit for emitting at least one light flux having a wavelength equal to or smaller than 500 nm; a deflection unit for deflecting at least one of the light fluxes emitted from the light source unit; and a scanning optical system for imaging the light flux deflected by the deflection unit onto a surface to be scanned. In the optical scanning device, the scanning optical system includes at least two lenses including a glass lens and a plastic lens, each of which has an opposite sign of power, and chromatic aberration of magnification in a main scanning direction in the optical scanning device is corrected to be equal to or smaller than 40 µm in the case where a difference of wavelengths in the light flux emitted from the light source unit is set to 5 nm.

12 Claims, 11 Drawing Sheets

OPTICAL SCANNING DEVICE AND IMAGE FORMING APPARATUS USING THE SAME

BACKGROUND OF THE INVENTION

1. Field of the Invention

The present invention relates to an optical scanning device and an image forming apparatus using the same. More particularly, the present invention relates to an optical scanning device that is suitably used for an apparatus such as a laser beam printer or a digital copying machine having an electrophotographic process, in which a light flux optically modulated and emitted from a light source unit is reflected and deflected on a polygon mirror serving as an optical deflection unit and then a surface to be scanned is scanned with the light flux through a scanning optical system to record image information. In addition, the present invention relates to a color image forming apparatus which uses a plurality of optical scanning devices and is composed of a plurality of image bearing members corresponding to respective colors.

2. Related Background Art

Up to now, in an optical scanning device used for a laser beam printer (LBP) or the like, a light flux optically modulated according to an image signal and emitted from a light source unit is periodically deflected by, for example, an optical deflector composed of a rotating polygonal mirror (polygon mirror). The deflected light flux is converged to form a spot shape on a photosensitive recording medium (photosensitive drum) by a scanning optical system having an fθ characteristic. The surface of the recording medium is scanned with the light flux to perform image recording.

FIG. 7 is a schematic view showing a main part of a conventional optical scanning device.

In FIG. 7, a divergent light flux emitted from a light source unit 1 is converted into a substantially parallel light flux by a collimator lens 3. The substantially parallel light flux is limited by a diaphragm 2 and incident into a cylindrical lens 4 having predetermined refractive power only in the sub scanning direction. Of the substantially parallel light flux incident into the cylindrical lens 4, the light flux within the main scanning section is exited without changing an optical state. The light flux within the sub scanning section is converged and imaged as a substantial linear image onto a deflection surface (reflection surface) 5a of a deflection unit 5 composed of a polygon mirror.

The light flux which is deflected on the deflection surface 5a of the deflection unit 5 is guided onto a photosensitive drum surface 9 serving as a surface to be scanned through a scanning optical system 6 having an fθ characteristic. By rotating the deflection unit 5 in a direction indicated by an arrow "A", the photosensitive drum surface 9 is scanned with the light flux in a direction indicated by an arrow "B" to record image information.

Further, in order to achieve high speed scanning, a multi-beam optical scanning device that simultaneously forms a plurality of scanning lines by light fluxes from a plurality of light sources has been proposed and commercially available from various companies. FIG. 8 is a schematic view showing a main part of a multi-beam optical scanning device. Two light fluxes emitted from light sources 81 and 82 are converted into parallel light fluxes by collimator lenses 83 and 84 and then synthesized into one by a synthesizing optical element 85. The synthesized light flux forms a linear image extended in the main scanning direction near a deflection surface of a polygon mirror 87 by the action of a cylindrical lens 86 and then forms a light spot on a photosensitive drum 89 by a scanning optical system 88. Therefore, the two scanning lines can be formed by performing optical scanning once, so that extremely high speed scanning can be achieved as compared with a conventional optical scanning device. With respect to a multi-beam light source other than one using the above-mentioned synthesizing optical element, a monolithic multi-beam laser in which a large number of light emitting points exist has been produced. In the case where the monolithic multi-beam laser is used, it is unnecessary to use the synthesizing optical element. Thus, it is possible to simplify the optical system and the optical adjustment.

A semiconductor laser used as a conventional light source (for example, Japanese Patent Application Laid-Open No. H9-021944) is an infrared laser (780 nm) or a visible laser (675 nm). However, in order to realize a high resolution, the development of an optical scanning device in which a minute spot shape is obtained by using a short wavelength laser having an oscillating wavelength of 500 nm or less is under way. The advantage of the use of the short wavelength laser is that a minute spot size which is about half of a conventional spot size can be achieved while an exit F number of the scanning optical system is kept equal to a conventional one. In the case where a spot size is reduced to half of the conventional spot size while using the infrared laser, it is necessary to increase the intensity of the scanning optical system to about two times larger than that in a conventional case. A focal depth is proportional to a wavelength of a used light source and to the square of the exit F number of the scanning optical system. Therefore, to obtain the same spot size, the focal depth in the infrared laser becomes equal to or smaller than about ½ of the focal depth in the short wavelength laser.

In such an optical scanning device, in order to record image information with high precision, it is necessary to preferably correct a curvature of an image plane over the entire surface to be scanned, to have a distortion characteristic (fθ characteristic) related to a uniform speed between an angle of view θ and an image height Y, and to make spot sizes on the image plane uniform at respective image heights. Various optical scanning devices or various scanning optical systems that satisfy the optical characteristics like those have been proposed up to now.

In particular, in the optical scanning device using the multi-beam light sources, in order to prevent a jitter (variations in scanning lines on the photosensitive drum surface in the main scanning direction) resulting from a difference of wavelengths among the plurality of light sources, a measure in which the light sources are selected so as to minimize the difference of wavelengths among the light sources have been taken. In the case where the jitter resulting from the difference of wavelengths among the light sources (chromatic aberration of magnification) is corrected by the scanning optical system, as disclosed in Japanese Patent Application Laid-Open No. H9-021944, a plurality of glass lenses having different dispersion characteristics are required. Therefore, as compared with a scanning optical system in which no chromatic aberration of magnification is corrected, generally, the number of lenses increases, thereby increasing the cost. In addition, there is a limitation with respect to the selection of wavelengths of the light sources, so that it is hard to completely make the wavelengths uniform. An increase in the cost required for the selection of the wavelengths also becomes a problem.

Further, when the semiconductor laser is activated, an image quality reduces due to a variation in wavelength which is called a mode hopping. Thus, even in an optical scanning device other than the optical scanning device using the multi-beam light sources, in order to improve the stability of the image quality, it is necessary to minimize the jitter caused by the variation in wavelength.

Further, as compared with the case where the infrared laser is used, a dispersion of the optical material becomes larger in the case of the high precision optical scanning device in which the wavelength of the light source is shortened, and this becomes a problem. FIG. 9 is a sectional view showing a main part of a general optical scanning device using two plastic lenses (see Table 3 with respect to design values). A light beam emitted from the light source 1 is converted into substantially parallel light by the collimator lens 3. Then, the parallel light is temporarily imaged to the vicinity of the reflection surface 5a of the deflection unit 5 in the sub scanning direction by the cylindrical lens 4. The light beam which is deflected and reflected on the polygon mirror 5 is scanned at constant speed by the two refractive lenses 7 and 8 and imaged to a minute spot on the surface to be scanned 9. FIG. 10 is a graph showing a calculation result of chromatic aberration of magnification with respect to the infrared laser (780 nm) used as the conventional light source and a purple-blue color laser (408 nm) used for the high resolution optical scanning device in the case where the optical scanning device is used. FIG. 10 is a plot of differences between imaging positions in the main scanning direction in the case where a difference of wavelength is set to 5 nm and an imaging position in the main scanning direction at a reference wavelength for each image height (for example, a difference between an imaging position at 785 nm and an image position at 780 nm). In the optical system using the two plastic lenses made of the same material, the chromatic aberration of magnification cannot fundamentally be corrected. Up to now, the dispersion characteristic of the material is in a level in which a problem is not really caused because the oscillating wavelength of the laser is relatively long. Therefore, even in the case where the chromatic aberration of magnification is not corrected by the scanning optical system, the jitter can be reduced by the measure such as the selection of the light sources. However, in the case where an optical system of the same type as the one using the two plastic lenses is used for the short wavelength laser, the dispersion characteristic of the material is deteriorated four times to eight times (see FIG. 11), so that the chromatic aberration of magnification of about 70 µm is caused in the circumference of an image. This corresponds to about 1.6 pixels in an image forming apparatus having 600 dpi. Thus, the correction of the chromatic aberration of magnification is an essential prerequisite in an optical scanning device using the short wavelength laser having 500 nm or less. However, because the number of materials having the dispersion characteristics is small for the plastic lenses, the chromatic aberration of magnification cannot be corrected using only the plastic lenses.

TABLE 1

(Conventional Example) Design data

| Wavelength, Refractive index | | | | Lens 7 (Figure) | |
|---|---|---|---|---|---|
| | | | | First plane | Second plane |
| Use wavelength | λ (nm) | 408 | | | |
| Lens 7 Refractive index | nd | 1.53064 | R | −8.16372E+01 | −4.45500E+01 |
| | vd | 55.50 | K | −1.55555E+00 | −5.06325E−01 |
| Lens 8 Refractive index | nd | 1.53064 | B4 | 6.47801E−08 | 3.12584E−07 |
| | vd | 55.50 | B6 | 1.11313E−09 | 2.34564E−10 |
| Light beam angle | | | B8 | −3.11807E−12 | −2.40882E−13 |
| Incident angle to polygon | θp | −70 | B10 | 1.20455E−15 | −7.09973E−16 |
| Maximal exit angle on polygon | θe | 45 | | | |
| Arrangement | | | | Lens 8 (Figure) | |
| | | | | First plane | Second plane |
| Polygon surface to lens 7 | e1 | 25 | | | |
| Central thickness of lens 7 | e2 | 11 | R | −3.60006E+02 | ∞ |
| Lens 7 to lens 8 | e3 | 77 | K | −4.13148E+01 | |
| Central thickness of lens 8 | e4 | 5 | B4 | 2.31574E−07 | |
| Lens 8 to surface to be scanned | Sk | 105.36476 | B6 | −2.28750E−11 | |
| Polygon axis to surface to be scanned | L | 229.78 | B8 | 1.24904E−15 | |
| Effective scanning width | W | 297 | B10 | −2.71574E−20 | |

SUMMARY OF THE INVENTION

An object of the present invention is to provide an image forming apparatus that uses a short wavelength light source having 500 nm or less, in which a displacement of imaging position (chromatic aberration of magnification) in the main scanning direction resulting from a difference in wavelengths of multi-beam light sources or a variation in wavelength such as a mode hopping is suppressed in order to perform printing at precision equal to or higher than a conventional case, the image forming apparatus being less costly and having a strong resistance to environmental variation.

According to a first aspect of the present invention, there is provided an optical scanning device, including:

light source means for emitting at least one light flux having a wavelength equal to or smaller than 500 nm;

deflection means for deflecting at least one of the light fluxes emitted from the light source means; and a scanning optical system for imaging the light flux deflected by the deflection means onto a surface to be scanned, in which the scanning optical system includes at least two lenses including a glass lens and a plastic lens, each of which has an opposite sign of power, and chromatic aberration of magnification in a main scanning direction in the optical scanning device is corrected to be equal to or smaller than 40 µm in the case where a difference of wavelengths in the light flux emitted from the light source means is set to 5 nm.

According to a second aspect of the present invention, in the optical scanning device according to the first aspect of the present invention, the scanning optical system includes a glass lens, a first plastic lenses, and a second plastic lens, which are disposed in order from the deflection means, the glass lens having negative power in the main scanning direction, the first plastic lens having positive power in the main scanning direction and the second plastic lens.

According to a third aspect of the present invention, in the optical scanning device according to the second aspect of the present invention, the scanning optical system satisfies a relational expression, $$|\Phi_G/\nu_G+\Phi_P/\nu_P|<0.02\times\Phi$$

where $\Phi_G$: power of the glass lens in the main scanning direction on an optical axis of the scanning optical system, $\nu_G$: an Abbe number of the glass lens, $\Phi_P$: synthetic power of the first plastic lens and the second plastic lens in the main scanning direction on the optical axis of the scanning optical system, $\nu_P$: an Abbe number of the first plastic lens and the second plastic lens, and $\Phi$: synthetic power of all systems of the scanning optical system in the main scanning direction on the optical axis of the scanning optical system.

According to a fourth aspect of the present invention, in the optical scanning device according to the second aspect of the present invention, at least one surface of each of the first plastic lens and the second plastic lens in the main scanning direction is aspherical.

According to a fifth aspect of the present invention, in the optical scanning device according to the first aspect of the present invention, the light source means includes a multi-beam light source that emits at least two light fluxes.

According to a sixth aspect of the present invention, there is provided an image forming apparatus, including:

the optical scanning device according to any one of the first to fifth aspects of the present invention;

a photosensitive member located on the surface to be scanned;

a developing unit that develops as a toner image an electrostatic latent image formed on the photosensitive member which is scanned with the light flux emitted from the optical scanning device;

a transferring unit that transfers the developed toner image onto a material to be transferred; and a fixing device that fixes the transferred toner image onto the material to be transferred.

According to a seventh aspect of the present invention, there is provided an image forming apparatus, including:

the optical scanning device according to the sixth aspect of the present invention; and a printer controller that converts code data inputted from an external device into an image signal and outputs the image signal to the optical scanning device.

According to an eighth aspect of the present invention, there is provided a color image forming apparatus, including:

a plurality of the optical scanning devices according to any one of the first to fifth aspects of the present invention; and a plurality of image bearing members arranged at positions on the surface to be scanned by the plurality of optical scanning devices and form images of different colors.

According to a ninth aspect of the present invention, there is provided a color image forming apparatus, including:

the optical scanning devices according to the eighth aspect of the present invention; and a printer controller that converts code data inputted from an external device into an image signal and outputs the image signal to the optical scanning devices.

According to a tenth aspect of the present invention, there is provided an optical scanning device, including:

light source means for emitting at least one light flux;

deflection means for deflecting at least one of the light fluxes emitted from the light source means; and a scanning optical system for imaging the light flux deflected by the deflection means onto a surface to be scanned, in which the scanning optical system includes a glass lens and two plastic lenses, and chromatic aberration of magnification in a main scanning direction is corrected to be equal to or smaller than 40 μm in the case where a difference of wavelengths is set to 5 nm.

According to an eleventh aspect of the present invention, in the optical scanning device according to the tenth aspect of the present invention, the scanning optical system includes a glass lens, a first plastic lenses, and a second plastic lens, which are disposed in order from the deflection means, the glass lens having negative power in the main scanning direction, the first plastic lens having positive power in the main scanning direction and the second plastic lens.

According to a twelfth aspect of the present invention, in the optical scanning device according to the eleventh aspect of the present invention, the scanning optical system satisfies a relational expression, $$|\Phi_G/\nu_G+\Phi_P/\nu_P|<0.02\times\Phi$$

where $\Phi_G$: power of the glass lens in the main scanning direction on an optical axis of the scanning optical system, $\nu_G$: an Abbe number of the glass lens, $\Phi_P$: synthetic power of the first plastic lens and the second plastic lens in the main scanning direction on the optical axis of the scanning optical system, $\nu_P$: an Abbe number of the first plastic lens and the second plastic lens, and $\Phi$: synthetic power of all systems of the scanning optical system in the main scanning direction on the optical axis of the scanning optical system.

According to a thirteenth aspect of the present invention, in the optical scanning device according to the tenth aspect of the present invention, at least one surface of each of the first plastic lens and the second plastic lens in the main scanning direction is aspherical.

According to a fourteenth aspect of the present invention, in the optical scanning device according to the tenth aspect of the present invention, the light source means includes a multi-beam light source that emits at least two light fluxes.

According to a fifteenth aspect of the present invention, there is provided an image forming apparatus, including:

the optical scanning device according to any one of the tenth to fourteenth aspects of the present invention;

a photosensitive member located on the surface to be scanned;

a developing unit that develops as a toner image an electrostatic latent image formed on the photosensitive member which is scanned with the light flux emitted from the optical scanning device;

a transferring unit that transfers the developed toner image onto a material to be transferred; and a fixing device that fixes the transferred toner image onto the material to be transferred.

According to a sixteenth aspect of the present invention, there is provided an image forming apparatus, including:

the optical scanning device according to the fifteenth aspect of the present invention; and a printer controller that converts code data inputted from an external device into an image signal and outputs the image signal to the optical scanning device.

According to a seventeenth aspect of the present invention, there is provided a color image forming apparatus, including:

a plurality of the optical scanning devices according to any one of the tenth to fourteenth aspects of the present invention; and a plurality of image bearing members arranged at positions on the surface to be scanned by the plurality of optical scanning devices and form images of different colors.

According to an eighteenth aspect of the present invention, there is provided a color image forming apparatus, including:

the optical scanning devices according to the seventeenth aspect of the present invention; and a printer controller that converts code data inputted from an external device into an image signal and outputs the image signal to the optical scanning devices.

Further features of the present invention will be apparent from the drawings and the descriptions.

DETAILED DESCRIPTION OF THE PREFERRED EMBODIMENTS

Embodiment 1

Figure 1:
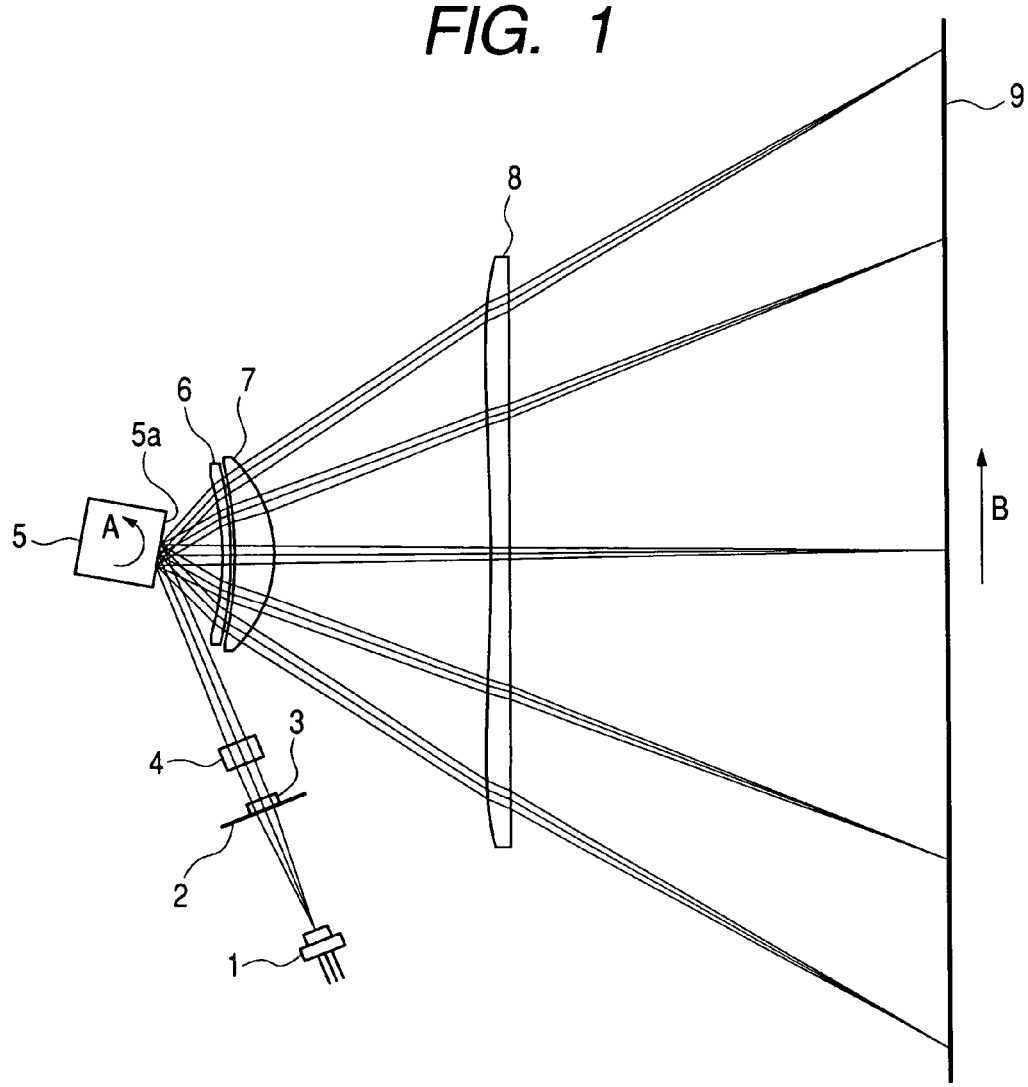
FIG. 1 is a main scanning sectional view in accordance with Embodiment 1 of the present invention.

FIG. 1 is a main scanning sectional view showing an optical scanning device according to Embodiment 1 of the present invention.

Here, a main scanning direction indicates a direction perpendicular to the rotational axis of a deflection unit. A sub scanning direction indicates a direction parallel to the rotational axis of the deflection unit. In addition, a main scanning section indicates a plane which is parallel to the main scanning direction and includes the optical axes of fθ lenses 6, 7, and 8.

A divergent light flux emitted from a semiconductor laser 1 serving as a light source unit is limited by a diaphragm 2 so as to reduce a width of the light flux, thereby obtaining a desirable spot size. Then, the light flux is converted into a substantially parallel light flux by a collimator lens 3. The substantially parallel light flux is imaged as a linear image extended in the main scanning direction onto the vicinity of a deflection surface 5a of a deflection unit 5 described later by a cylindrical lens 4 having predetermined refractive power in only the sub scanning direction. The deflection unit 5 is composed of, for example, a polygon mirror having four surfaces (rotating polygonal mirror) and rotated in a direction indicated by an arrow "A" in FIG. 1 at a constant rate by a drive unit such as a motor (not shown). According to scanning optical systems 6, 7, and 8 composed of the fθ lenses having fθ characteristics, the deflection light flux which is reflected and deflected on the deflection unit 5 is imaged onto a photosensitive drum surface 9 serving as a surface to be scanned. In addition, a tangle error of the deflection surface 5a of the deflection unit 5 is corrected by the scanning optical systems. At this time, the deflection light flux which is reflected and deflected on the deflection surface 5a of the deflection unit 5 is guided onto the photosensitive drum surface 9 through the scanning optical systems 6, 7, and 8. When the polygon mirror 5 is rotated in a direction indicated by an arrow "A", the photosensitive drum surface 9 is optically scanned in a direction indicated by an arrow "B". Therefore, scanning lines are formed on the photosensitive drum surface 9, thereby performing image recording.

Here, an optical arrangement and figures in this embodiment are shown in Table 2.

TABLE 2

| (Embodiment 1) Design data | | | | |
|---|---|---|---|---|
| Wavelength, Refractive index | | | Lens 6 (Figure) | |
| Use wavelength | λ (nm) | 408 | First plane | Second plane |
| Lens 6 Refractive index | nd | 1.92286 R | −8.10801E+01 | −1.23558E+02 |
| | vd | 18.90 | | |
| Lens 7 Refractive index | nd | 1.53064 | Lens 7 (Figure) | |
| | vd | 55.50 | First plane | Second plane |

TABLE 2-continued (Embodiment 1)
Design data

| | | | | | |
|---|---|---|---|---|---|
| Lens 8 Refractive index | nd | 1.53064 | R | −1.60021E+02 | −4.18888E+01 |
| | vd | 55.50 | K | −2.73864E+02 | −1.69038E+00 |
| Light beam angle | | | B4 | −4.55143E−08 | −3.43813E−07 |
| Incident angle to polygon | θp | −70 | B6 | 4.26115E−09 | −4.59514E−09 |
| Maximal exit angle on polygon | θe | 45 | B8 | −1.56323E−12 | 3.79468E−12 |
| Arrangement | | | B10 | −6.39118E−16 | −1.93928E−15 |
| Polygon surface to lens 6 | e1 | 18.5 | | | |
| Central thickness of lens 6 | e2 | 2 | | Lens 8 (Figure) | |
| Polygon surface to lens 7 | e3 | 0.7705 | | First plane | Second plane |
| Central thickness of lens 7 | e4 | 11 | R | −3.73210E+02 | ∞ |
| Lens 7 to lens 8 | e5 | 61.66046 | K | −1.92767E+01 | |
| Central thickness of lens 8 | e6 | 5 | B4 | 3.61379E−07 | |
| Lens 8 to surface to be scanned | Sk | 125.17585 | B6 | −4.41290E−11 | |
| Polygon axis to surface to be scanned | L | 230.52 | B8 | 2.63613E−15 | |
| Effective scanning width | W | 297 | B10 | −4.59952E−20 | |

The fθ lens 6 is a spherical glass lens having negative power. With respect to an incident plane and an exit plane of the fθ lens 7 (made of plastic) having positive power and with respect to an incident plane of the fθ lens 8 (made of plastic) which has negative power on axis and positive power on off-axis, a shape of each meridional line is based on an aspherical shape which can be indicated as a function of up to the tenth order. For example, in the case where an intersection point between the fθ lens 7 (made of plastic) and the optical axis is set to an origin, the optical axis direction is set to an X-axis, and an axis perpendicular to the optical axis within the main scanning section is set to an Y-axis, a meridional line direction corresponding to the main scanning direction is indicated by the expression, $$X = \frac{\frac{Y^2}{R}}{1+\sqrt{1-(1+k)\left(\frac{Y}{R}\right)^2}} + B4 \times Y^4 + B6 \times Y^6 + B8 \times Y^8 + B10 \times Y^{10}$$

(where R is a curvature radius of a meridional line and K, B4, B6, B8, and B10 are aspherical coefficients).

In addition, a sagittal direction corresponding to the sub scanning direction is indicated by the expression, $$S = \frac{\frac{Z^2}{Rs^*}}{1+\sqrt{1-\left(\frac{Z}{Rs^*}\right)^2}}$$

S indicates a shape of a sagittal line which includes a normal of the meridional line at each position in the meridional direction and is defined within a plane perpendicular to the main scanning surface.

Here, a curvature radius in the sub scanning direction (sagittal line curvature radius) Rs* at a position away from the optical axis by Y in the main scanning direction is indicated by the expression, $$Rs^* = Rs \times (1 + D2 \times Y^2 + D4 \times Y^4 + D6 \times Y^6 + D8 \times Y^8 + D10 \times Y^{10})$$

(where Rs is the sagittal line curvature radius on the optical axis and D2, D4, D6, D8, and D10 are sagittal line change coefficients).

Note that the figure is defined by the above-mentioned expressions in this embodiment. However, the scope of the present invention is not limited to this.

In this embodiment, in the case where $\Phi_G$: power of the glass lens 6 in the main scanning direction on the optical axis, $\nu_G$: Abbe number of the glass lens 6, $\Phi_P$: synthetic power of the plastic lenses 7 and 8 in the main scanning direction on the optical axis, $\nu_P$: Abbe number of the plastic lenses 7 and 8, and $\Phi$: synthetic power of all systems in the main scanning direction on the optical axis, $|\Phi_G/\nu_G + \Phi_P/\nu_P| = 5.4245E\text{-}5$ and $0.02 \times \Phi = 1.0562E\text{-}4$ are obtained, so that $|\Phi_G/\nu_G + \Phi_P/\nu_P| < 0.02 \times \Phi$     (Expression 1)

is satisfied. In the case where a material is selected and power arrangement is made so as to exceed this numeral range, it is hard to preferably correct the chromatic aberration of magnification.

In this embodiment, the short wavelength light source having λ=408 nm, the concave lens 6 made of glass, and the two plastic lenses 7 and 8 are used, and the chromatic aberration of magnification in the main scanning direction is corrected.

Here, the plastic lenses are used to obtain an aberration correction effect caused by the aspherical shape. As compared with the optical systems composed of only spherical lenses made of glass, the number of lenses can be reduced and cost reduction is achieved.

Table 3 provides a summary of refractive indexes of optical materials used in Embodiments 1 and 2 and a conventional example in the cases of λ=408 nm and λ=413 nm. Based on the numeral values, the chromatic aberration of magnification is calculated as described later.

TABLE 3

(Refractive index)

| | Wavelength (nm) | 408 | 413 |
|---|---|---|---|
| | Embodiment 1 | | |
| Refractive index | Lens 6 | 2.015970 | 2.010590 |
| | Lens 7 and 8 | 1.546123 | 1.545322 |
| | Embodiment 2 | | |
| Refractive index | Lens 6 | 1.840280 | 1.837270 |
| | Lens 7 and 8 | 1.546123 | 1.545322 |
| | Conventional Example | | |
| Refractive index | Lens 7 and 8 | 1.546123 | 1.545322 |
| | Wavelength (nm) | 780 | 785 |
| Refractive index | Lens 7 and 8 | 1.524200 | 1.524085 |

Figure 2:
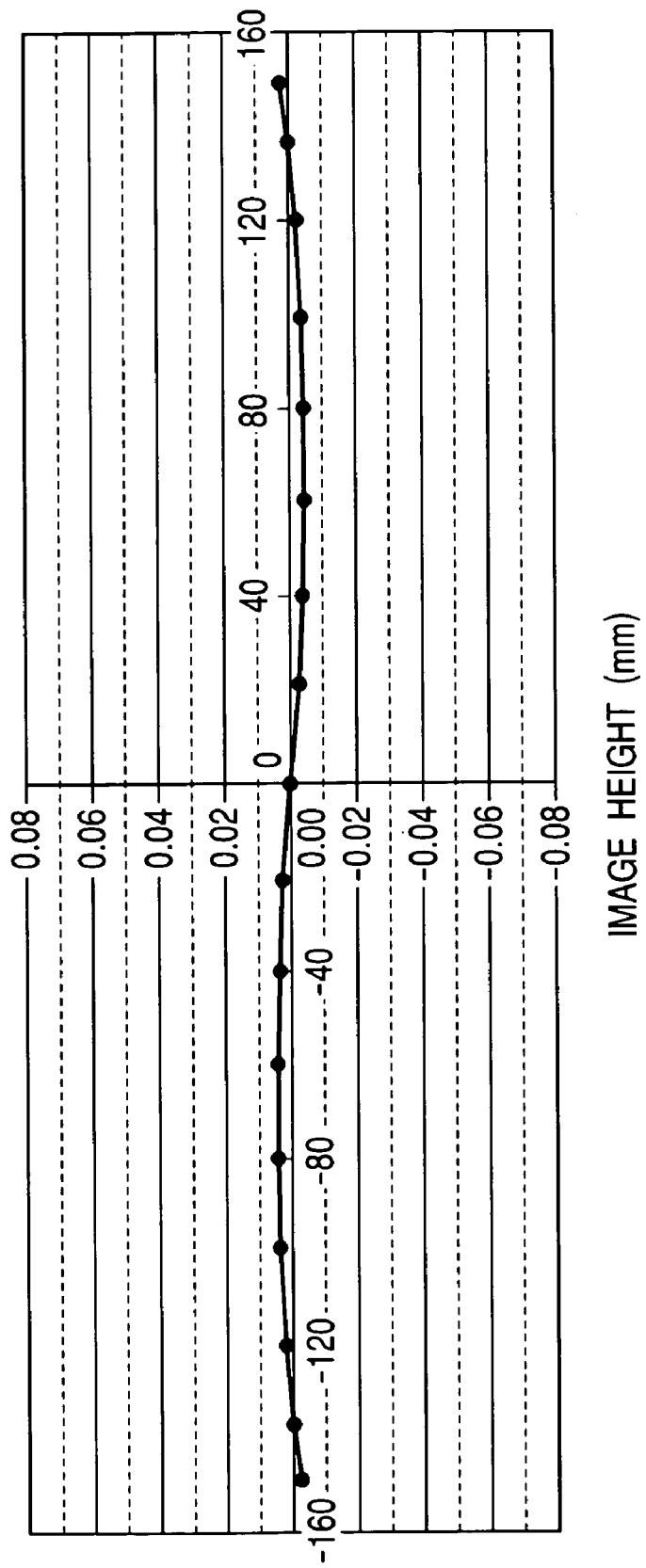
FIG. 2 is a graph showing chromatic aberration of magnification in accordance with Embodiment 1 of the present invention.

FIG. 2 is a graph showing the chromatic aberration of magnification in the main scanning direction, which is an effect in this embodiment. FIG. 2 is a plot of differences between imaging positions in the main scanning direction in the case where a difference of wavelengths $\Delta\lambda$ is set to 5 nm and an imaging position in the main scanning direction at a reference wavelength ($\lambda$=408 nm). It is apparent from FIG. 2 that the chromatic aberration of magnification is 5 μm or less for each image height. This corresponds to about 0.12 pixels in an image forming apparatus having 600 dpi and thus is a sufficiently small value.

Further, in the case where the light source is selected such that a difference of wavelengths becomes 5 nm or less, the chromatic aberration of magnification is further reduced. Therefore, a problem such as the generation of the jitter in the main scanning direction on the optical scanning device using at least two multi-beam lasers or the deterioration of image quality caused by a mode hopping is solved. Thus, a high quality optical scanning device can be provided.

The present invention may be applied to the conventional optical scanning device using the infrared laser ($\lambda$=780 nm) or the visible laser ($\lambda$=675 nm). In this case, the chromatic aberration of magnification is further corrected. Therefore, a higher quality and stable optical scanning device can be provided as compared with the optical scanning device used up to now.

Embodiment 2

Figure 3:
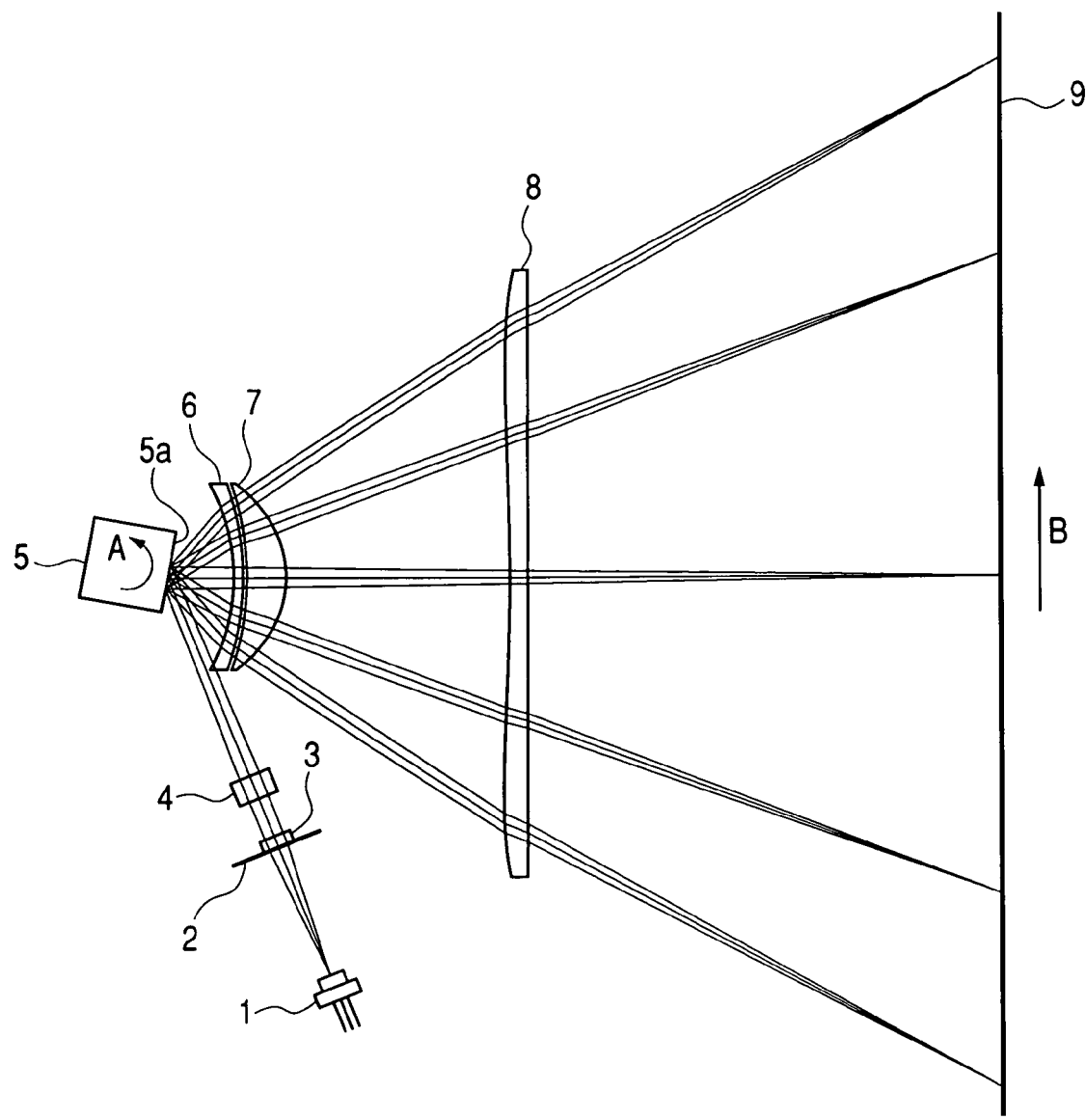
FIG. 3 is a main scanning sectional view in accordance with Embodiment 2 of the present invention.

FIG. 3 is a main scanning sectional view showing an optical scanning device according to Embodiment 2 of the present invention. A point different from Embodiment 1 is that the glass lens 6 made of a different material is designed.

Here, an optical arrangement and figures in this embodiment are shown in Table 4.

TABLE 4

(Embodiment 2) Design data

| Wavelength, Refractive index | | | | Lens 6 (Figure) | |
|---|---|---|---|---|---|
| Use wavelength | λ (nm) | 408 | | First plane | Second plane |
| Lens 6 Refractive index | nd | 1.784723 | R | −6.91823E+01 | −1.24036E+02 |
| | νd | 25.68 | | | |
| Lens 7 Refractive index | nd | 1.53064 | | Lens 7 (Figure) | |
| | νd | 55.50 | | First plane | Second plane |
| Lens 8 Refractive index | nd | 1.53064 | R | −1.07628E+02 | −3.55545E+01 |
| | νd | 55.50 | K | −3.49104E+01 | −7.24545E−01 |
| Light beam angle | | | B4 | −5.30926E−09 | −2.33592E−06 |
| Incident angle to polygon | θp | −70 | B6 | 3.95926E−09 | −1.64126E−09 |
| Maximal exit angle on polygon | θe | 45 | B8 | −2.53878E−12 | −6.41058E−13 |
| Arrangement | | | B10 | 8.88069E−16 | −7.30962E−16 |
| Polygon surface to lens 6 | e1 | 21 | | | |
| Central thickness of lens 6 | e2 | 2 | | Lens 8 (Figure) | |
| Polygon surface to lens 7 | e3 | 2 | | First plane | Second plane |
| Central thickness of lens 7 | e4 | 11 | R | −3.50398E+02 | ∞ |
| Lens 7 to lens 8 | e5 | 59.93856 | K | −8.4181E+00 | |
| Central thickness of lens 8 | e6 | 5 | B4 | 2.58077E−07 | |
| Lens 8 to surface to be scanned | Sk | 131.99593 | B6 | −1.33589E−11 | |
| Polygon axis to surface to be scanned | L | 239.35 | B8 | 5.99875E−16 | |
| Effective scanning width | W | 297 | B10 | −4.59952E−20 | |

In this embodiment, in the case where $\Phi_G$: power of the glass lens 6 in the main scanning direction on the optical axis, $\nu_G$: Abbe number of the glass lens 6, $\Phi_P$: synthetic power of the plastic lenses 7 and 8 in the main scanning direction on the optical axis, $\nu_P$: Abbe number of the plastic lenses 7 and 8, and $\Phi$: synthetic power of all systems in the main scanning direction on the optical axis, $|\Phi_G/\nu_G+\Phi_P/\nu_P|=2.1209E\text{-}5$ and $0.02\times\Phi=1.0558E\text{-}4$ are obtained, so that $$|\Phi_G/\nu_G+\Phi_P/\nu_P|<0.02\times\Phi \quad \text{(Expression 1)}$$

is satisfied.

Figure 4:
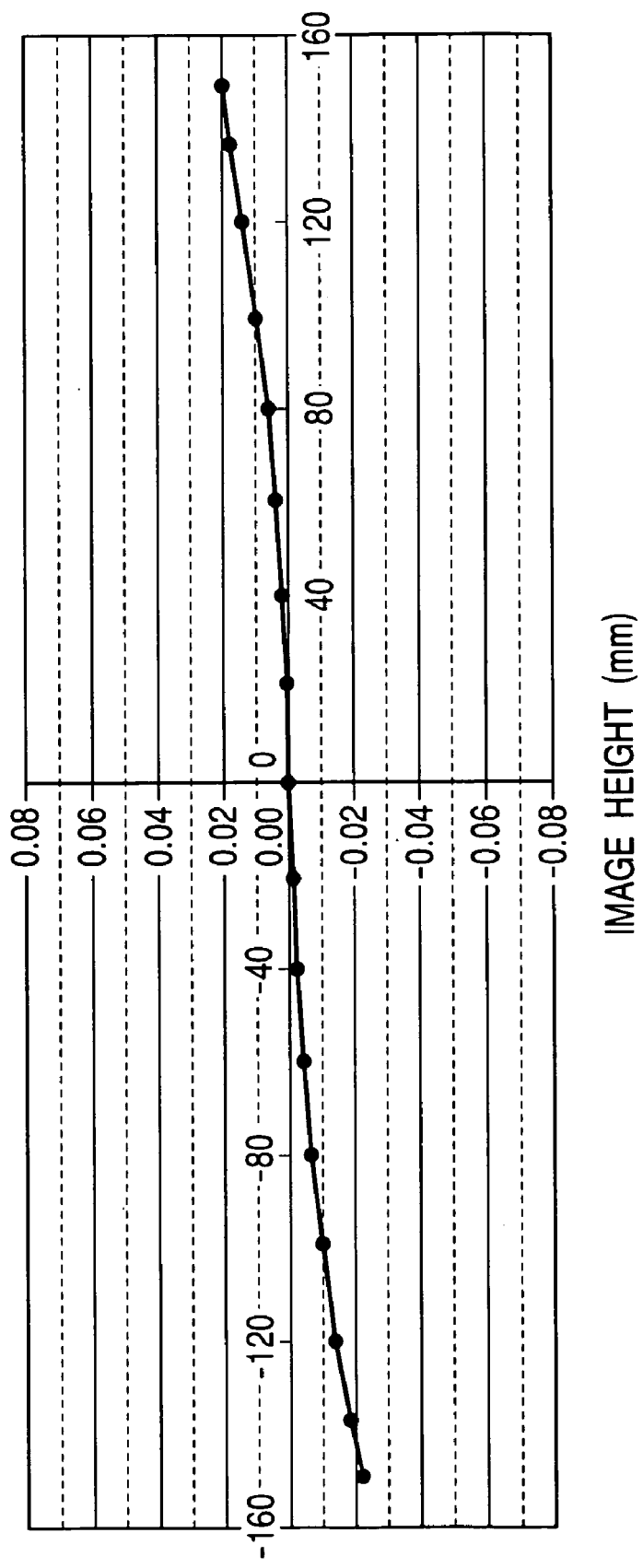
FIG. 4 is a graph showing chromatic aberration of magnification in accordance with Embodiment 2 of the present invention.

FIG. 4 is a graph showing the chromatic aberration of magnification in the case where the difference of wavelengths is set to 5 nm in this embodiment. The chromatic aberration of magnification is suppressed to 25 μm for a circumference image height. Thus, the chromatic aberration of magnification becomes equal to or smaller than a pixel size of 600 dpi (about 40 μm).

Embodiment 3

Figure 5:
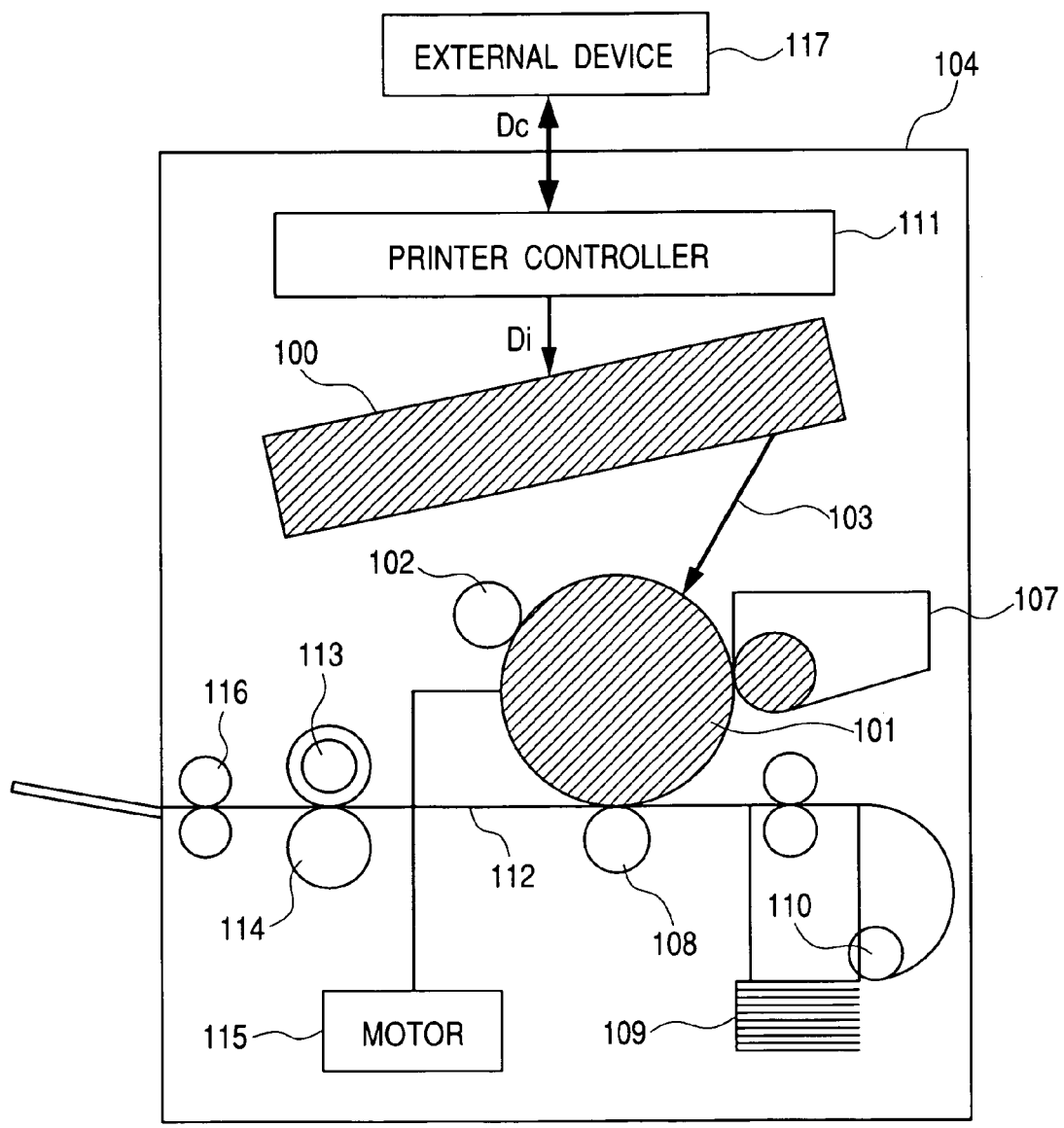
FIG. 5 is a main part schematic diagram showing an image forming apparatus according to the present invention.

FIG. 5 is a main part sectional view in the sub scanning direction, showing an image forming apparatus using the optical scanning device according to Embodiment 1 or 2. In FIG. 5, reference numeral 104 denotes an image forming apparatus. Code data Dc is inputted from an external device 117 such as a personal computer to the image forming apparatus 104. The code data Dc is converted into image data (dot data) Di by a printer controller 111 in the image forming apparatus 104. The image data Di is inputted to an optical scanning unit 100 having the structure indicated in Embodiment 1 or 2. A light beam 103 modulated according to the image data Di is emitted from the optical scanning unit 100. A photosensitive surface of a photosensitive drum 101 is scanned with the light beam 103 in the main scanning direction.

The photosensitive drum 101 serving as an electrostatic latent image bearing member (photosensitive member) is rotated clockwise by a motor 115. According to the rotation, the photosensitive surface of the photosensitive drum 101 is moved in the sub scanning direction orthogonal to the main scanning direction with respect to the light beam 103. A charging roller 102 for uniformly charging the surface of the photosensitive drum 101 is provided on an upper part of the photosensitive drum 101 so as to be contact with the surface thereof. The surface of the photosensitive drum 101 which is charged by the charging roller 102 is irradiated with the light beam 103 scanned by the optical scanning unit 100.

As described earlier, the light beam 103 is modulated according to the image data Di. The surface of the photosensitive drum 101 is irradiated with the light beam 103 to form an electrostatic latent image thereon. The electrostatic latent image is developed as a toner image by a developing unit 107 provided in the downstream side from the irradiation position of the light beam 103 in the rotational direction of the photosensitive drum 101 so as to be in contact with the photosensitive drum 101.

The toner image developed by the developing unit 107 is transferred onto a sheet 112 serving as a material to be transferred by a transfer roller 108 provided below the photosensitive drum 101 so as to oppose the photosensitive drum 101. The sheet 112 is contained in a sheet cassette 109 located in the front (right side in FIG. 5) of the photosensitive drum 101. Manual feed is also possible. A feed roller 110 provided at the end portion of the sheet cassette 109 serves to send the sheet 112 in the sheet cassette 109 to a transport path.

By the above operation, the sheet 112 to which an unfixed toner image is transferred is further transported to a fixing device located in the rear (left side in FIG. 5) of the photosensitive drum 101. The fixing device is composed of a fixing roller 113 having a fixing heater (not shown) therein and a pressure roller 114 provided so as to press the fixing roller 113. The sheet 112 transported from the transferring part is heated while it is pressurized by the press-contacting part between the fixing roller 113 and the pressure roller 114, so that the unfixed toner image on the sheet 112 is fixed. Further, a delivery roller 116 is provided in the rear of the fixing roller 113 and the fixed sheet 112 is delivered to the outside of the image forming apparatus 104 by the delivery roller 116.

Although not shown in FIG. 5, the printer controller 111 conducts not only data conversion described earlier but also control of each part of the image forming apparatus 104, which is represented by the motor 115, control of a polygon motor in the optical scanning unit as described later, and the like.

Figure 6:
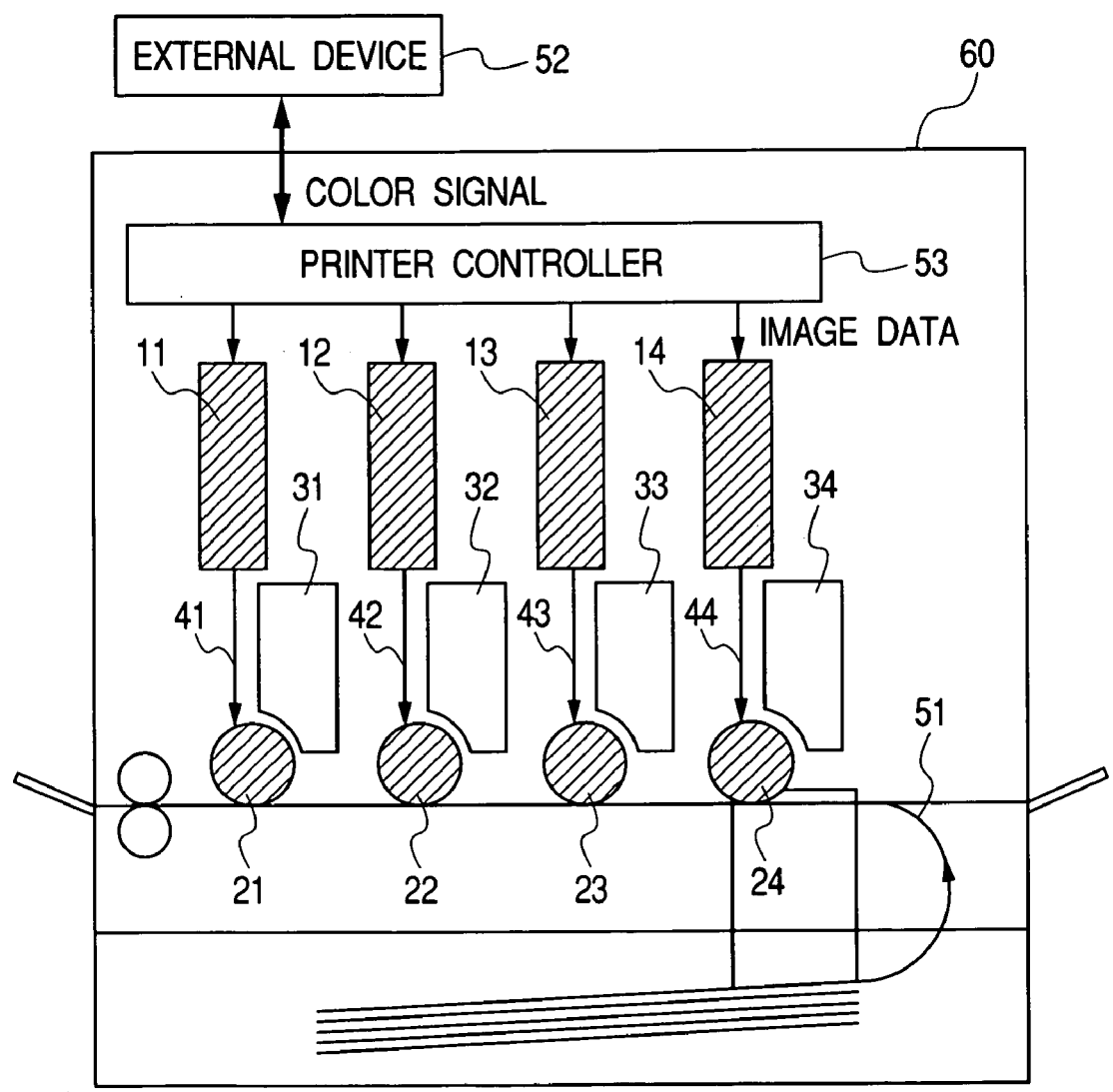
FIG. 6 is a main part schematic diagram showing a color image forming apparatus according to the present invention.
Figure 7:
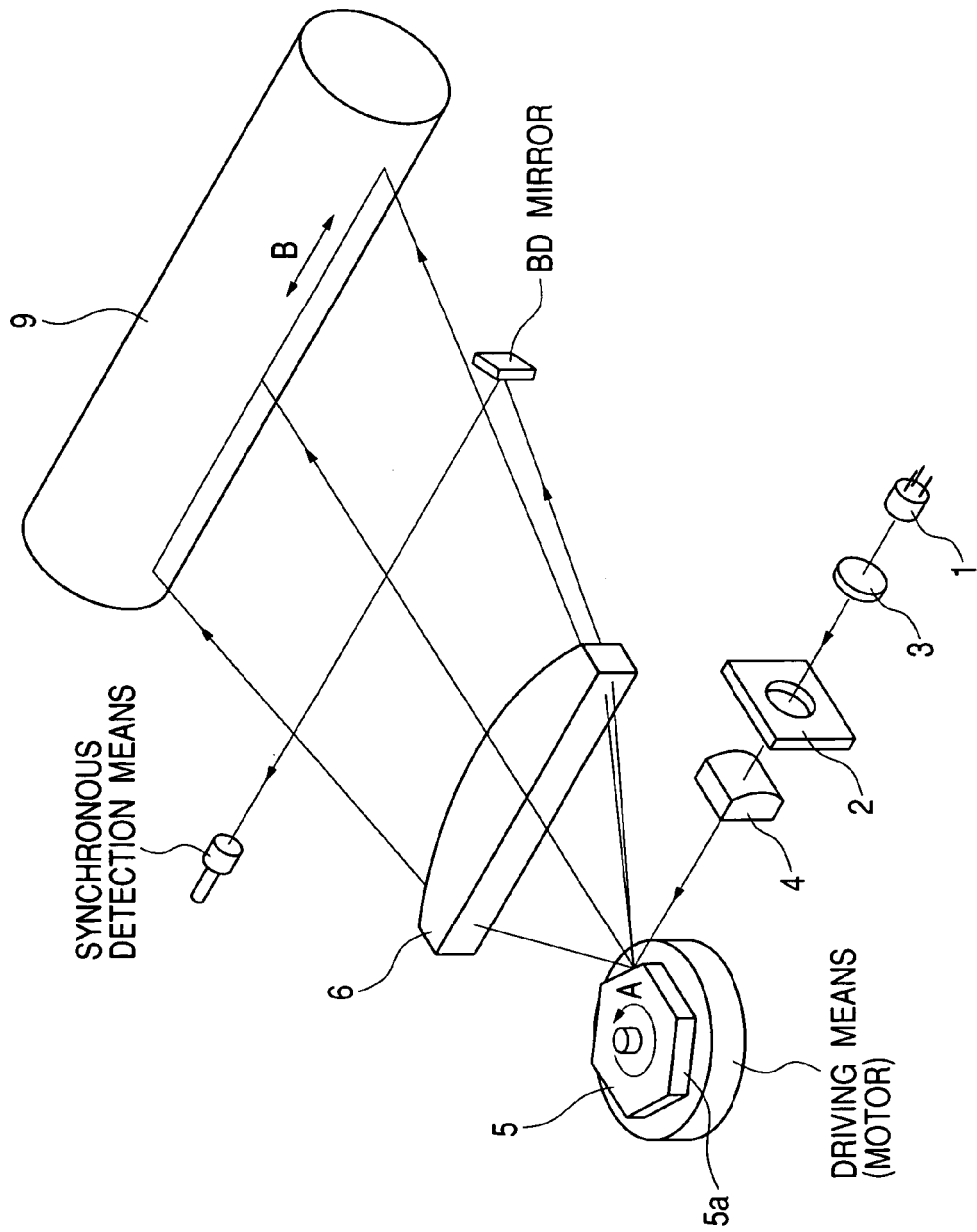
FIG. 7 is a perspective view showing a conventional optical scanning device.
Figure 8:
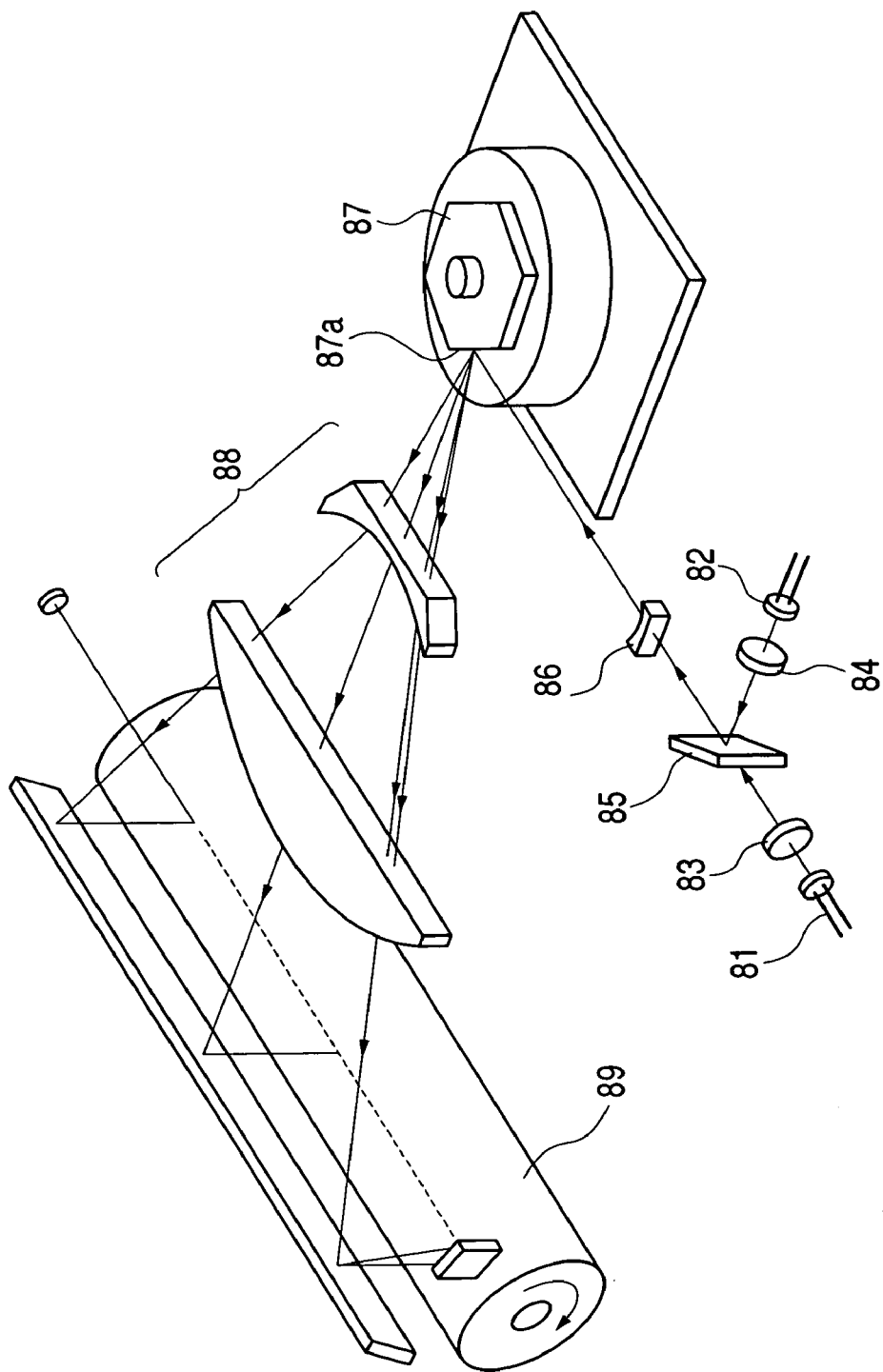
FIG. 8 is a perspective view showing a conventional optical scanning device using multi-beam light sources.
Figure 9:
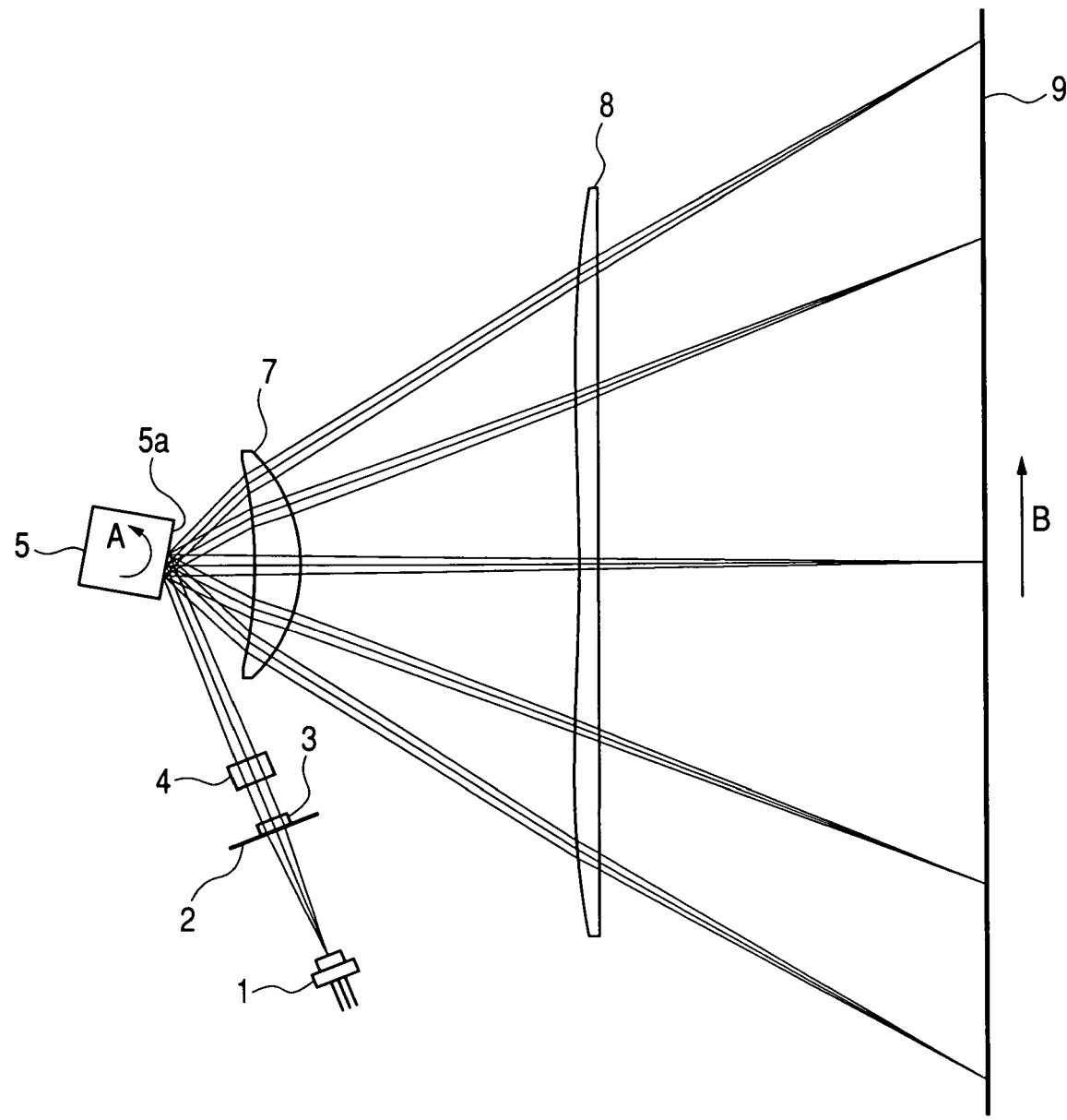
FIG. 9 is a main scanning sectional view showing a conventional scanning optical system.
Figure 10:
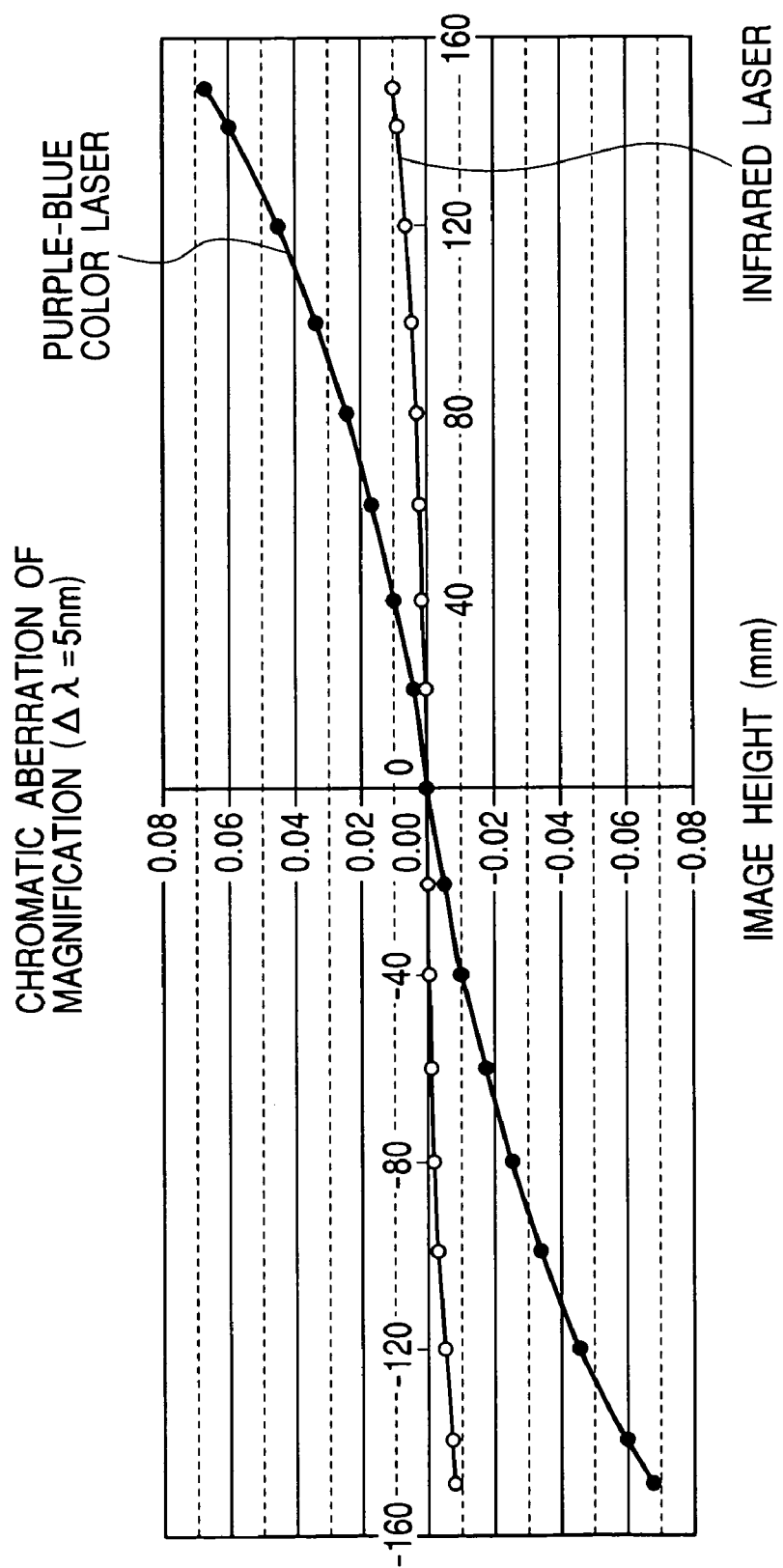
FIG. 10 is a graph showing chromatic aberration of magnification in the conventional scanning optical system.
Figure 11:
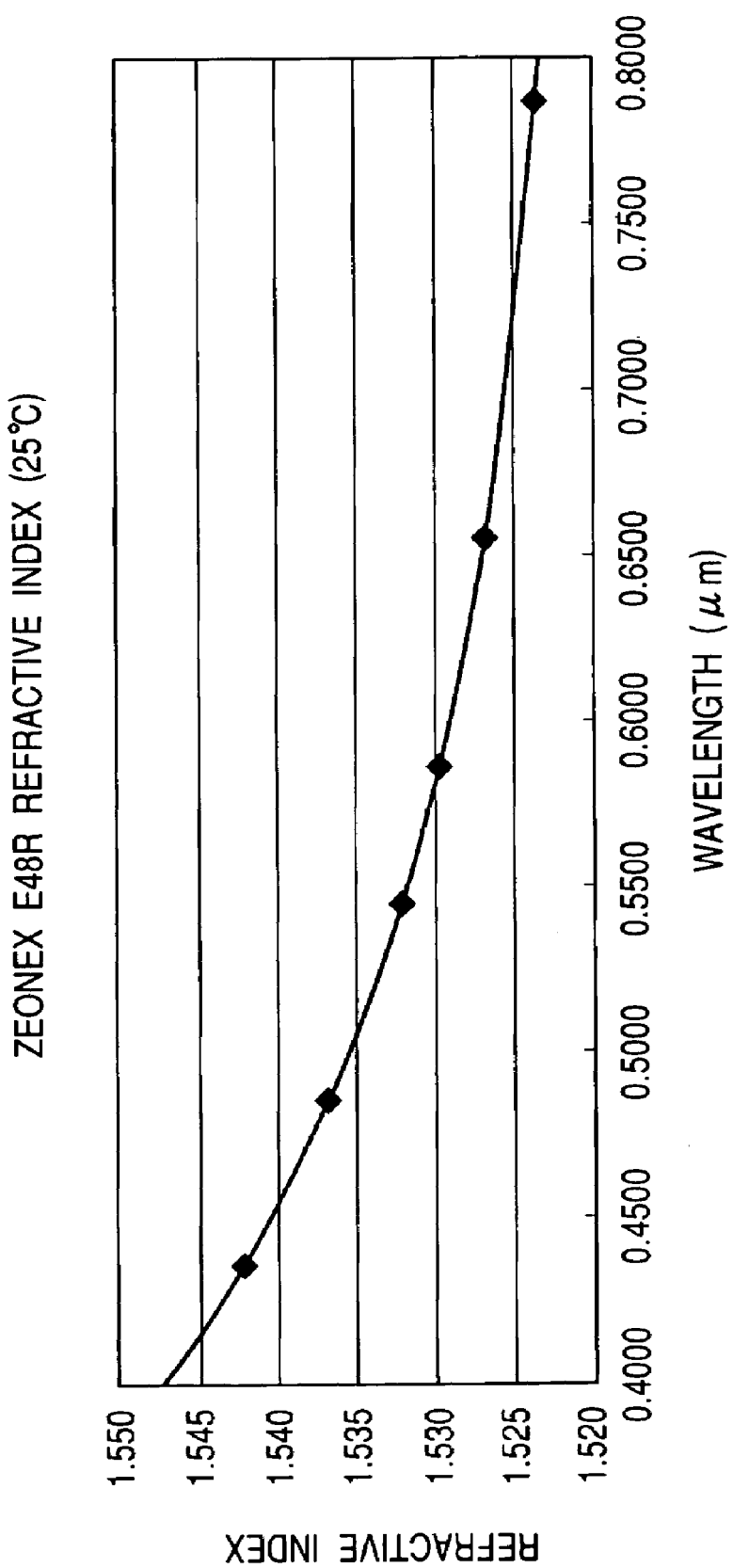
FIG. 11 is a graph showing a refractive index of an optical resin material.

FIG. 6 is a main part schematic diagram showing a color image forming apparatus according to an aspect of the present invention. This is a tandem type color image forming apparatus in which four optical scanning devices according to Embodiment 1 or 2 are arranged to record image information in parallel on the surfaces of the photosensitive drums serving as the image bearing members. In FIG. 6, reference numeral 60 denotes a color image forming apparatus; 11, 12, 13, and 14 each denote the optical scanning device having the structure described in Embodiment 1; 21, 22, 23, and 24 each denote the photosensitive drums serving as the image bearing members; 31, 32, 33, and 34 each denote the developing unit, and 51 denotes a transport belt.

In FIG. 6, respective color signals of R (red), G (green), and B (blue) are inputted from an external device 52 such as a personal computer to the color image forming apparatus 60. The color signals are converted into respective image data (dot data) of C (cyan), M (magenta), Y (yellow), and B (black) by a printer controller 53 in the color image forming apparatus 60. These image data are separately inputted to the optical scanning devices 11, 12, 13, and 14. Light beams 41, 42, 43, and 44 modulated according to the respective image data are emitted from the optical scanning devices 11, 12, 13, and 14. The photosensitive surfaces of the photosensitive drums 21, 22, 23 and 24 are scanned with the light beams in the main scanning direction.

According to the color image forming apparatus according to the aspect of the present invention, the four optical scanning devices (11, 12, 13, and 14) are arranged, each device corresponding to C (cyan), M (magenta), Y (yellow), and B (black). The image signals (image information) are recorded in parallel on the surfaces of the photosensitive drums 21, 22, 23 and 24 by the optical scanning devices, thereby printing a color image at high speed.

According to the color image forming apparatus according to the aspect of the present invention, as described above, the latent images of the respective colors are formed on the corresponding surfaces of the photosensitive drums 21, 22, 23 and 24 using the light beams based on the respective image data from the four scanning optical devices 11, 12, 13, and 14. After that, the multi-transfer is conducted on a recording material to produce a full color image.

For example, a color image reading apparatus including a CCD sensor may be used as the external device 52. In this case, the color image reading apparatus and the color image forming apparatus 60 compose a color digital copying machine.

According to the present invention, an optical scanning device capable of always obtaining a preferable image by preferably correcting the chromatic aberration of magnification in the main scanning direction and an image forming apparatus using the optical scanning device can be provided.

What is claimed is:

1. An optical scanning device, comprising:
light source means for emitting at least one light flux having a wavelength equal to or smaller than 500 nm;
deflection means for deflecting at least one of the light fluxes emitted from the light source means; and
a scanning optical system for imaging the light flux deflected by the deflection means onto a surface to be scanned,
wherein the scanning optical system consists of a glass lens, a first plastic lens, and a second plastic lens, which are disposed in this order from the deflection means, wherein the glass lens has negative power in the main scanning direction, the first plastic lens has positive power in the main scanning direction, and the second plastic lens has negative power in the main scanning direction,
wherein at least one surface of each of the first plastic lens and the second plastic lens in the main scanning direction is aspherical, and
wherein the scanning optical system satisfies a relational expression, $|\Phi G/\nu G+\Phi P/\nu P|<0.02\times\Phi$ where
$\Phi G$: power of the glass lens in the main scanning direction on an optical axis of the scanning optical system,
$\nu G$: an Abbe number of the glass lens,
$\Phi P$: synthetic power of the first plastic lens and the second plastic lens in the main scanning direction on the optical axis of the scanning optical system,
$\nu P$: an Abbe number of the first plastic lens and the second plastic lens, and
$\Phi$: synthetic power of all systems of the scanning optical system in the main scanning direction on the optical axis of the scanning optical system.

2. An optical scanning device according to claim 1, wherein the light source means includes a multi-beam light source that emits at least two light fluxes.

3. An image forming apparatus, comprising:
the optical scanning device according to claim 1;
a photosensitive member located on the surface to be scanned;
a developing unit that develops as a toner image an electrostatic latent image formed on the photosensitive member which is scanned with the light flux emitted from the optical scanning device;
a transferring unit that transfers the developed toner image onto a material to be transferred; and
a fixing device that fixes the transferred toner image onto the material to be transferred.

4. An image forming apparatus, comprising:
the optical scanning device according to claim 3; and
a printer controller that converts code data inputted from an external device into an image signal and outputs the image signal to the optical scanning device.

5. A color image forming apparatus, comprising:
a plurality of the optical scanning devices according to claim 1; and
a plurality of image bearing members arranged at positions on the surface to be scanned by the plurality of optical scanning devices and form images of different colors.

6. A color image forming apparatus, comprising:
the optical scanning devices according to claim 5; and
a printer controller that converts code data inputted from an external device into an image signal and outputs the image signal to the optical scanning devices.

7. An optical scanning device, comprising:
light source means for emitting at least one light flux;
deflection means for deflecting at least one of the light fluxes emitted from the light source means; and
a scanning optical system for imaging the light flux deflected by the deflection means onto a surface to be scanned,
wherein the scanning optical system consists of a glass lens, a first plastic lens, and a second plastic lens, which are disposed in this order from the deflection means, wherein the glass lens has negative power in the main scanning direction, the first plastic lens has positive power in the main scanning direction, and the second plastic lens has negative power in the main scanning direction,
wherein at least one surface of each of the first plastic lens and the second plastic lens in the main scanning direction is aspherical, and
wherein the scanning optical system satisfies a relational expression, $|\Phi G/\nu G+\Phi P/\nu P|<0.02\times\Phi$ where
$\Phi G$: power of the glass lens in the main scanning direction on an optical axis of the scanning optical system,
$\nu G$: an Abbe number of the glass lens,
$\Phi P$: synthetic power of the first plastic lens and the second plastic lens in the main scanning direction on the optical axis of the scanning optical system,
$\nu P$: an Abbe number of the first plastic lens and the second plastic lens, and
$\Phi$: synthetic power of all systems of the scanning optical system in the main scanning direction on the optical axis of the scanning optical system.

8. An optical scanning device according to claim 1, wherein the light source means includes a multi-beam light source that emits at least two light fluxes.

9. An image forming apparatus, comprising:
the optical scanning device according to claim 7;
a photosensitive member located on the surface to be scanned;
a developing unit that develops as a toner image an electrostatic latent image formed on the photosensitive member which is scanned with the light flux emitted from the optical scanning device;
a transferring unit that transfers the developed toner image onto a material to be transferred; and
a fixing device that fixes the transferred toner image onto the material to be transferred.

10. An image forming apparatus, comprising:
the optical scanning device according to claim 9; and
a printer controller that converts code data inputted from an external device into an image signal and outputs the image signal to the optical scanning device.

11. A color image forming apparatus, comprising:
a plurality of the optical scanning devices according to claim 7; and
a plurality of image bearing members arranged at positions on the surface to be scanned by the plurality of optical scanning devices and form images of different colors.

12. A color image forming apparatus, comprising:
the optical scanning devices according to claim 11; and
a printer controller that converts code data inputted from an external device into an image signal and outputs the image signal to the optical scanning devices.

* * * * *